(12) United States Patent
Wen et al.

(10) Patent No.: US 9,369,904 B2
(45) Date of Patent: Jun. 14, 2016

(54) METHOD AND APPARATUS FOR TRANSMITTING BUFFER STATUS REPORT IN WIRELESS NETWORK

(75) Inventors: Pingping Wen, Shanghai (CN); Tao Yang, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 356 days.

(21) Appl. No.: 13/643,510

(22) PCT Filed: May 3, 2010

(86) PCT No.: PCT/CN2010/072401
§ 371 (c)(1),
(2), (4) Date: Jan. 7, 2013

(87) PCT Pub. No.: WO2011/137576
PCT Pub. Date: Nov. 10, 2011

(65) Prior Publication Data
US 2013/0114445 A1 May 9, 2013

(51) Int. Cl.
*G01R 31/08* (2006.01)
*H04B 7/005* (2006.01)
(Continued)

(52) U.S. Cl.
CPC ............. *H04W 24/10* (2013.01); *H04L 5/0007* (2013.01); *H04L 5/0053* (2013.01); *H04W 72/1252* (2013.01); *H04W 72/1284* (2013.01)

(58) Field of Classification Search
CPC ............. H04W 24/10; H04W 72/1252; H04L 5/0053; H04L 5/0007
USPC .......................................................... 370/329
See application file for complete search history.

(56) References Cited

U.S. PATENT DOCUMENTS 5,239,545 A * 8/1993 Buchholz .......... H04W 74/0891
370/348

6,574,795 B1 * 6/2003 Carr ....................... H04N 7/088
348/E7.031
(Continued)

FOREIGN PATENT DOCUMENTS

CN 101132220 A 2/2008
CN 101547435 A 9/2009
(Continued)

OTHER PUBLICATIONS

Mediatek, "Scheduling Mechanism for Carrier Aggregation," 3GPP TSG-RAN WG2 Meeting #69bis, Beijing, China, Apr. 12-16, 2010, Agenda Item 7.1.1.7, Document for Discussion and Decision, R2-102109, pp. 1/3-3/3, 3/12.
(Continued)

*Primary Examiner* — Faruk Hamza
*Assistant Examiner* — Abu-Sayeed Haque
(74) *Attorney, Agent, or Firm* — Fay Sharpe, LLP (57) ABSTRACT

The invention proposes a method and an apparatus for transmitting a buffer status report in a wireless network, where a user equipment is configured with a plurality of component carriers, the user equipment obtains an amount of data to be transmitted after respective media access layer protocol data units corresponding to the respective component carriers are generated, generates the uplink buffer status report message according to the amount of data to be transmitted, and reports the uplink buffer status report message to a base station serving the user equipment. The invention address the problem of how to report buffer status information when there are a plurality of media access layer protocol data units in a transport time interval. With the solution of the invention, the base station can definitively know how many uplink resources can be allocated for the user equipment to guarantee more efficient scheduling.

15 Claims, 3 Drawing Sheets

(51) Int. Cl.
*H04J 3/16* (2006.01)
*H04W 24/10* (2009.01)
*H04L 5/00* (2006.01)
*H04W 72/12* (2009.01)

(56) References Cited

U.S. PATENT DOCUMENTS

| | | | | |
|---|---|---|---|---|
| 7,366,165 | B2* | 4/2008 | Kawarai | H04L 12/46 370/235 |
| 8,233,539 | B2* | 7/2012 | Kwon | H03M 13/356 375/240.13 |
| 8,458,280 | B2* | 6/2013 | Hausauer | H04L 47/6265 709/212 |
| 2006/0143444 | A1* | 6/2006 | Malkamaki | H04L 1/0083 713/160 |
| 2006/0171353 | A1* | 8/2006 | Nagata | H04B 7/04 370/329 |
| 2006/0290756 | A1* | 12/2006 | Hatasa | B41J 2/17546 347/86 |
| 2009/0040977 | A1* | 2/2009 | Lee | H04W 72/1257 370/329 |
| 2009/0219951 | A1* | 9/2009 | Chun | H04W 8/26 370/474 |
| 2009/0313519 | A1* | 12/2009 | Nagaraja | H04L 1/0042 714/751 |
| 2011/0170495 | A1* | 7/2011 | Earnshaw | H04W 72/02 370/329 |
| 2011/0292895 | A1* | 12/2011 | Wager | H04L 5/0007 370/329 |
| 2012/0069805 | A1* | 3/2012 | Feuersanger | H04W 72/1284 370/329 |
| 2013/0121385 | A1* | 5/2013 | Tran | H04B 1/38 375/219 |

FOREIGN PATENT DOCUMENTS

| | | |
|---|---|---|
| EP | 2068505 A1 | 6/2009 |
| EP | 2 077 691 A2 | 7/2009 |

OTHER PUBLICATIONS

Samsung, "On BSR for REL-10," 3GPP TSG-RAN2#69bis meeting, R2-102459, pp. 1-3, Beijing, China, Apr. 12-16, 2010.

Nokia Siemens Networks, Nokia Corporation "BSR for Carrier Aggregation," 3GPP TSG-RAN WG2 Meeting #69bis, R2-102164, pp. 1-2, Beijing, China, Apr. 12-16, 2010.

International Search Report for PCT/CN2010/072401 dated Feb. 10, 2011.

Huawei, "Buffer Status Reporting for CA," 3GPP TSG-RAN WG2 meeting #69, San Francisco, USA, Feb. 22-Feb. 26, 2010, Agenda item: 7.1.8, Document for: Discussion, Decision, R2-101031, 2 pages.

"3rd Generation Partnership Project; Technical Specification Group Radio Access Network; Evolved Universal Terrestrial Radio Access (E-UTRA); Medium Access Control (MAC) protocol specification, (Release 9)," 3GPP TS 36.321 V9.2.0 (Mar. 2010), Technical Specification, 45 pages.

ZTE, "Considerations on scheduling in carrier aggregation," 3GPP TSG RAN WG2 Meeting #66bis, Los Angeles, USA, Jun. 29-Jul. 3, 2009, R2-093886, Agenda Item: 7.3, Document for: Discussion, 4 pages.

Alcatel-Lucent Shanghai Bell, Alcatel-Lucent, "BSR reporting in Carrier Aggregation," 3GPP TSG-RAN WG2 Meeting #70, May 10-14, 2010, Montreal, Canada, R2-103277, Agenda item: 7.1.9, Document for: Discussion and Decision, 4 pages.

Alcatel-Lucent Shanghai Bell, Alcatel-Lucent, "BSR reporting in Carrier Aggregation," 3GPP TSG-RAN WG2 Meeting #70, May 10-14, 2010, Montreal, Canada, R2-102880, Agenda item: 7.1.9, Document for: Discussion and Decision, 4 pages.

* cited by examiner

METHOD AND APPARATUS FOR TRANSMITTING BUFFER STATUS REPORT IN WIRELESS NETWORK

FIELD OF THE INVENTION

The present disclosure relates to wireless communications and particularly to a base station and user equipment based upon carrier aggregation in the LTE-A.

BACKGROUND OF THE INVENTION

A Buffer Status Report (BSR) is of great importance in an uplink system due to its provision of User Equipment (UE) side information required for scheduling at a base station (evolved NodeB or eNB). In the Long Term Evolution-Advance (LTE-A) Release 8/9, a buffer status report is relatively simple because there is only one Media Access Control Protocol Data Unit (MAC PDU) in each Transport Time Interval (TTI). However in the LTE-A Release 10, a plurality of MAC PDUs can be transmitted in one TTI due to the introduction of Carrier Aggregation (CA), i.e., a plurality of Component Carriers (CCs), and thus it is desirable to address some new issues occurring with a buffer status report.

SUMMARY OF THE INVENTION

The invention considers a new feature in the LTE-A to establish a rule of a buffer status report. The invention provides a buffer status report mechanism for a communication system with carrier aggregation.

According to a first aspect of the invention, there is provided a method of reporting an uplink buffer status report message in a user equipment configured with a plurality of component carriers, the method including the steps of: A. obtaining an amount of data to be transmitted after respective media access layer protocol data units corresponding to the respective component carriers are generated; B. generating the uplink buffer status report message according to the amount of data to be transmitted; and C. reporting the uplink buffer status report message to a base station serving the user equipment.

According to a second aspect of the invention, there is provided an apparatus for reporting an uplink buffer status report message in a user equipment configured with a plurality of component carriers, the apparatus including: a first obtaining device configured to obtain an amount of data to be transmitted after respective media access layer protocol data units corresponding to the respective component carriers are generated; a generating device configured to generate the uplink buffer status report message according to the amount of data to be transmitted; and a reporting device configured to report the uplink buffer status report message to a base station serving the user equipment.

The invention addresses the problem of how to report buffer status information when there are a plurality of transport blocks, i.e., a plurality of media access layer protocol data units, in one transport time interval.

With the solution of the invention, a base station can definitively know how many uplink resources can be allocated for a user equipment to guarantee more efficient scheduling.

The invention can make use of a padding buffer status report message from different perspectives of reliability, efficiency, accuracy, etc., to thereby improve the reliability of the buffer status report message, improve the efficiency of data transmission or improve the precision of the g buffer status report message.

Preferably an embodiment of the invention further provides increment information for a buffer size table with a coarse granularity to further improve the precision

BRIEF DESCRIPTION OF DRAWINGS

The foregoing and other features, objects and advantages of the invention will become apparent upon review of the following detailed description of non-limiting embodiments given with reference to the drawings in which.

Identical or like reference numerals denote identical or like components throughout the drawings.

DETAILED DESCRIPTION OF EMBODIMENTS

Firstly a brief introduction of types of BSRs and trigger procedures will be made in this description in order to facilitate reading and understanding of a technical solution of the invention.

A basic idea of scheduling at a base station lies in that a radio resource is allocated only to a UE or transmission from the UE when there is available data to be transmitted or received. In the downlink, an amount of data to be transmitted to each UE is apparently known to a scheduler of the base station; but in the uplink direction, a scheduling decision is made at the base station and a data buffer is located at the UE, so it is necessary for the UE to report a BSR message to the base station for providing the base station with information of how many data in total of the UE are stored in an uplink buffer area to be transmitted so that the base station can allocate and schedule a resource according to the uplink resource buffer information from the UE to thereby avoid an excessive resource from being allocated or scheduled for the UE, which would otherwise result in a waste of the resource.

With two configured timers including a periodic BSR timer (periodicBSR-Timer) and a regular BSR timer (retxBSR-Timer) and optional signaling logicChannelGroup for each logical channel, Radio Resource Control (RRC) indicates which Logical Channel Group (LCG) this logical channel belongs.

A BSR message may be triggered upon occurrence of the following situations:

There is a logical channel which belongs to a specific logical channel group and which has its uplink data (e.g., RLC/PDCP control information, service data, etc.) to be transmitted present in an RLC or PDCP entity; or there is a logical channel which has a higher priority than any logical channel belonging to a specific logical channel group and which has data to be transmitted; or none of logical channels belonging to a specific logical channel group has any data to be transmitted (that is, a BSR with a buffer area size of 0 is transmitted possibly for synchronization of buffer area information between the eNB and the UE), and a BSR triggered in these situations is referred to as a "regular BSR";

An uplink resource has been allocated and the number of padding bits is larger than or equal to a BSR MAC control element plus its sub-header, and a BSR triggered at this time belongs to a "padding BSR";

The retxBSR-Timer expires, and any logical channel belonging to a specific logical channel group has data to be transmitted, and a BSR triggered at this time belongs to a "regular BSR"; and The periodicBSR-Timer expires, and a BSR triggered at this time belongs to a "periodic BSR".

For regular and periodic BSRs:

A long BSR is reported if more than one Logical Channel Group (LCG) has data to be transmitted in a current TTI in which the BSR is transmitted;

Otherwise, a short BSR is reported.

For a padding BSR:

If the number of padding bits is larger than or equal to a short BSR control element plus its sub-header, but smaller than a long BSR control element plus its sub-header, then:

A truncated BSR is reported if more than one Logical Channel Group (LCG) has data to be transmitted in a current TTI in which a BSR is transmitted, and this BSR carries therein a logical channel group to which a highest-priority logical channel with data to be transmitted belongs;

Otherwise, a short BSR is reported; and

A long BSR is reported if the number of padding bits is larger than or equal to a long BSR control element plus its sub-header.

Thus when to transmit a long BSR, a short BSR or a truncated BSR is determined by the total number of valid uplink transmission resources for transmission of a BSR, how many logical signals there are for buffers which are not empty and whether a specific event is triggered in the UE. A long BSR reports an amount of buffer data for 4 logical channel groups, and a short BSR reports an amount of uplink buffer data for 1 logical channel group.

Figure 1:
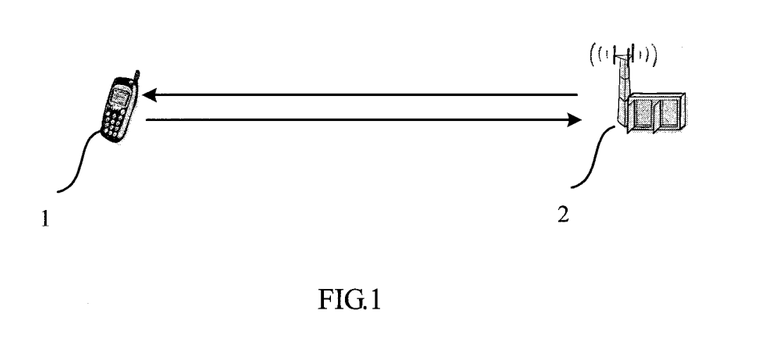
FIG. 1 illustrates a schematic diagram of a network topology according to an embodiment of the invention.

FIG. 1 illustrates a diagram of a network topology according to an embodiment of the invention, where a base station 2 serves a user equipment 1, and the user equipment 1 reports a BSR to the base station 2.

Figure 2:
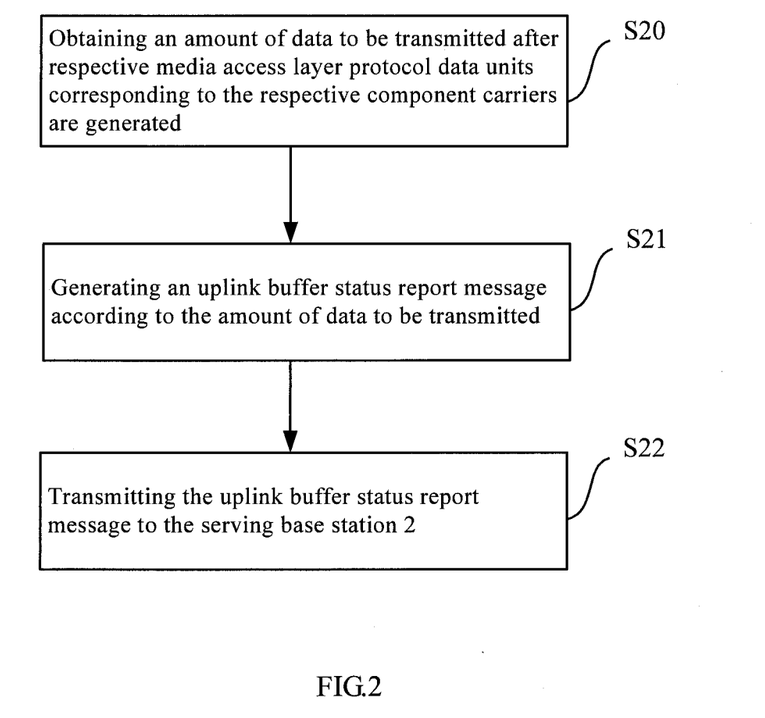
FIG. 2 illustrates a flow chart of a system method according to an embodiment of the invention.

FIG. 2 illustrates a flow chart of a system method according to an embodiment of the invention.

Firstly in the step S20, the user equipment 1 is configured with at least one component carrier, and the user equipment 1 obtains an amount of data to be transmitted after respective media access layer protocol data units corresponding to the respective component carriers are generated. In the LTE-A, a plurality of CCs are transmitted concurrently in one TTI, one MAC PDU is encapsulated over one CC, and the CC corresponds in one-to-one to the MAC PDU. Thus a plurality of MAC PDUs can be transmitted concurrently in one TTI in a CA scenario. A BSR transmitted from the user equipment 1 to the base station 2 is used to provide the base station 2 with an amount of data, in an uplink buffer of the user equipment 1, which are suitable for transmission, particularly an amount of data in the buffer to be transmitted after all the MAC PDUs over the respective component carriers have been created.

Furthermore a buffer status report MAC control element can include a long BSR format and a short BSR/truncated BSR format.

Then in the step S21, the user equipment 1 generates an uplink buffer status report message according to the amount of data to be transmitted. Then in the step S22, the user equipment 1 reports the uplink buffer status report message to the base station 2 serving the user equipment 1.

The step S21 of generating and step S22 of reporting a BSR in a CA scenario will be described below in details for a regular/periodic BSR and a padding BSR respectively.

Regular/Periodic BSR

Since a regular/periodic BSR provides user specific information instead of CC specific information, that is, the regular/periodic BSR is irrelevant to a CC, it is not necessary to report a plurality of BSRs over different CCs in one TTI. Thus in the step S21, the user equipment 1 can simply encapsulate only one regular/periodic BSR in an MAC PDU of one CC even if there are a plurality of MAC PDUs over different CCs in one TTI. Stated otherwise, for a regular/periodic BSR, the user equipment 1 reports only one BSR per TTI in a carrier aggregation scenario.

How the user equipment 1 determines in which MAC PDU the BSR shall be included will be described below in an embodiment.

Those skilled in the art shall appreciate service data over at least one logical channel are multiplexed in one MAC PDU, and a different logical channel has a different priority. In order to guarantee a Quality of Service (QoS), power is adjusted by firstly lowering transmission power of a signal transmitted over a Physical Uplink Shared Channel (PUSCH) without carrying Uplink Control Information (UCI) while maintaining transmission power of a signal transmitted over a PUSCH carrying UCI, where the UCI includes a BSR, a power residual, etc., that is, the PUSCH carrying the UCI has a higher priority than the PUSCH without carrying UCI, that is, the PUSCH carrying an MAC control element has a higher priority. That is, the BSR has a higher priority. Thus the BSR shall be included in the same MAC PDU carrying data belonging to the channel with the highest priority, that is, in the step S21, the user equipment 1 encapsulates a regular/periodic BSR together with data from a logical channel with the highest priority into the same MAC PDU, for example, the user equipment encapsulates a regular/periodic BSR together with data with the highest QoS requirement, e.g., VoIP service data, into the same MAC PDU and transmits the MAC PDU to the base station 2. Then in the step S22, the user equipment 1 reports the MAC PDU, in which the regular/periodic BSR is encapsulated, to the base station 2.

Padding BSR

In the LTE-A Release 8, a padding BSR will be triggered if there are padding bits sufficient to support a short BSR/a truncated BSR or a long BSR as described previously. In the Release 8, only one MAC PDU is transmitted in one TTI, so there is at most one padding BSR consisted of a plurality of padding bits. In a carrier aggregation scenario, there are a plurality of MAC PDUs, so a plurality of padding BSRs are possible.

Currently there are two alternative solutions to creating an MAC PDU in a CA scenario, that is, one is to encapsulate MAC PDUs sequentially in a specific order by generating one MAC PDU and then encapsulating at least a part of remaining data to be transmitted into a next MAC PDU and so on until corresponding data are encapsulated in the respective MAC PDUs; and the other is to encapsulate MAC PDUs transmitted over respective component carriers in parallel. Thus we will give the following discussion of these two situations of serial and parallel encapsulation respectively, and serial generation of MAC PDUs over respective CCs will be discussed firstly.

(1) MAC PDUs Over Different CCs are Encapsulated Serially in a Specific Order.

If a regular/periodic BSR is triggered, then the BSR (long BSR or short BSR) will be transmitted over one CC, and further padding bits in other MAC PDUs of other CCs can be allowed for transmission of padding BSRs. We will discuss different use solutions of these padding BSRs.

Solution A: a BSR is transmitted repeatedly in padding bits.

The user equipment 1 has generated an uplink buffer status report message in an MAC PDU corresponding to one component carrier, and the user equipment places repeatedly at least part of content of the uplink buffer status report message in padding bits of at least one other MAC PDU with the padding bits, that is, the user equipment 1 transmits a copy of a whole regular/periodic BSR or a part thereof in the form of a long BSR or a short/truncated BSR based upon allowed padding bits.

The step S21 can be divided into the following several sub-steps.

Firstly in the sub-step S210, the user equipment 1 obtains a size of the padding bits;

Then in the sub-step S211, the user equipment 1 places repeatedly all the content of the uplink buffer status report message in the padding bits of the other subsequent MAC PDU(s) with the padding bits, which is(are) transmitted in the same TTI, when the padding bits are sufficient to include all the content of the uplink buffer status report message, that is, in the case that the regular/periodic BSR is a long BSR, the padding BSR is the same as the regular/periodic BSR if the long BSR is supported in the padding bits;

Or the user equipment 1 places part of the content of the uplink buffer status report message sequentially in the padding bits of the other subsequent MAC PDU(s) with the padding bits, which is(are) transmitted in the same TTI, when the padding bits are sufficient to include the part of the content of the uplink buffer status report message, that is, the padding BSR includes part of buffer status information of the regular/periodic BSR if the regular/periodic BSR is a long BSR and the padding BSR is a short BSR/a truncated BSR, and this part belongs to an LCG with a higher priority. This principle is also applicable to a scenario where there is only a padding BSR when no regular/periodic BSR is triggered. A flow in which a regular/periodic BSR and then a padding BSR are generated when MAC PDUs are generated serially in a CA scenario will be described below in details with reference to FIG. 3, FIG. 4 and FIG. 5.

For example, there are three MAC PDUs to be transmitted in one TTI. When a regular/periodic BSR is triggered, the user equipment 1 shall transmit the regular/periodic BSR in one MAC PDU. In a preferred embodiment, the regular/periodic BSR is encapsulated in one MAC PDU for transmission in the step S21, for example, the BSR is encapsulated in a serial data packet which is the first to be generated, and a padding BSR is supported in both of the remaining two MAC PDUs.

Figure 3:
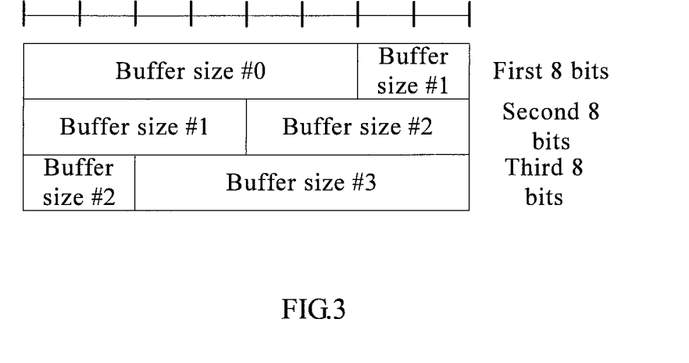
FIG. 3 illustrates an example of a long BSR included as a periodic/regular BSR in an MAC PDU according to an embodiment of the invention.

In an embodiment, buffer status information, i.e., a BSR, from four Logical Channel Groups (LCGs) shall be reported, and a long BSR as illustrated in FIG. 3 is included as a regular/periodic BSR in one MAC PDU. Thus the step S21 can further be subdivided into the following sub-steps S210, S211 and S211'. In the sub-step S210, the user equipment 1 obtains the size of padding bits of a next serial MAC PDU and determines whether the size of the padding bits of the next serial MAC PDU is sufficient to include all the content of the regular/periodic BSR; and when the padding bits are sufficient to include all the content of the regular/periodic BSR, then in the sub-step S211, the user equipment 1 fills all the content of the regular/periodic BSR in the padding bits; or if the padding bits are not sufficient to include all the content of the regular/periodic BSR, for example, the size of the padding bits can only support a short BSR, then in the sub-step S211', the user equipment 1 fills part of the content of the regular/periodic BSR in the padding bits of the next serial MAC PDU. According to a preferred embodiment, in the sub-step S211', the user equipment 1 firstly fills corresponding BSR information of the logical channel group with the highest priority in the padding bits of the next serial MAC PDU and then fills corresponding BSR information of the logical channel group with the second highest priority in padding bits of a further MAC PDU, according to a priority order of the logical channel groups corresponding to the BSR, and the sub-step S211' will be described in details with reference to FIG. 3, FIG. 4 and FIG. 5.

In FIG. 3, a long BSR is adopted as the regular/periodic BSR to report the buffer status information of the four logical channel groups respectively, that is, the corresponding amounts of data to be transmitted over the four logical channel groups, which are uplink buffer status information of a Logical Channel Group (LCG) #0, uplink buffer status information of a logical channel group #1, uplink buffer status information of a logical channel group #2 and uplink buffer status information of a logical channel group #3 respectively. In an existing protocol architecture, 6 bits are occupied respectively for the uplink buffer status information of each logical channel group, where the logical channel group #0 has a higher priority than the logical channel group #1, the logical channel group #1 has a higher priority than the logical channel group #2, and the logical channel group #2 has a higher priority than the logical channel group #3. If a padding BSR in the other two subsequent MAC PDUs only supports a short BSR, then the user equipment 1 firstly fills the logical channel group with the first priority, i.e. the logical channel group #0, as a short BSR in the MAC PDU next to the MAC PDU in which the long BSR as the regular/periodic BSR is encapsulated, as illustrated in FIG. 4; and fills the logical channel group with the second priority, i.e. the logical channel group #1, as a short BSR in the MAC PDU next to the next MAC PDU, as illustrated in FIG. 5, Furthermore in the step S22, the user equipment 1 transmits the short BSR for the LCG with the first priority as illustrated in FIG. 4 and the short BSR for the LCG with the second priority as illustrated in FIG. 5 respectively in the two MAC PDUs.

Figure 4:
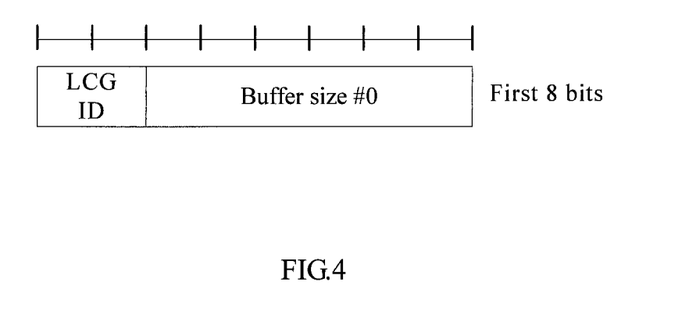
FIG. 4 and FIG. 5 illustrate an example of a short BSR corresponding to a logic channel group with a first priority and a second priority respectively according to an embodiment of the invention.
Figure 5:
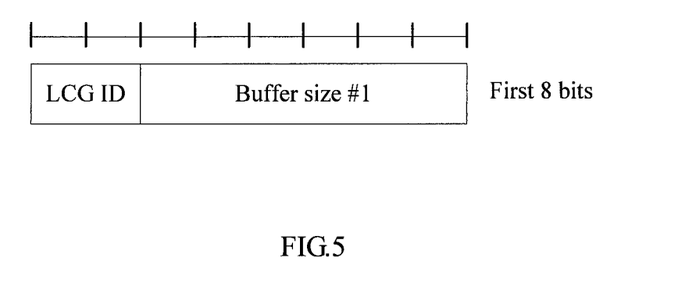

In another embodiment, if one padding BSR can support a long BSR and the other padding BSR can only support a short BSR, then the long BSR as illustrated in FIG. 3 will be included in one MAC PDU supporting a long BSR and the short BSR for the LCG with the first LCG as illustrated in FIG. 4 will be included in the other MAC PDU supporting a short BSR.

In summary, a copy of a whole periodic/regular BSR or a part thereof can be transmitted in padding bits to improve the reliability of transmission.

Solution B: when the user equipment 1 encapsulates MAC PDUs serially in sequence, a regular/periodic BSR was originally scheduled to be transmitted in the $n^{th}$ MAC PDU in one TTI, where n<N, and N represents the total number of MAC PDUs transmitted in one TTI, and in an embodiment, a regular/periodic BSR can be scheduled to be transmitted in the serial MAC PDU in one TTI, which is the last to be encapsulated. Thus the step S21 can further includes including at least a part of the BSR in padding bits of one or more MAC PDU encapsulated prior to the $n^{th}$ MAC PDU. Then the user equipment 1 determines whether the whole regular/periodic BSR or a part thereof has been included in padding bits of at least one MAC PDU encapsulated prior to the $n^{th}$ MAC PDU.

If at least one previously encapsulated MAC PDU has included the whole BSR to be reported, for example, the user equipment 1 has included buffer status information in the regular/periodic BSR into padding bits of one or more MAC PDU encapsulated prior to the $n^{th}$ MAC PDU, then the regular/periodic BSR may not be included in the $n^{th}$ MAC PDU, and thus a byte(s) in the $n^{th}$ MAC PDU, which was(were) originally scheduled to load therein the BSR, can be spared for encapsulation of data content.

If no BSR or only part of the buffer status information is included in a previously encapsulated MAC PDU, then the user equipment 1 includes the remaining BSR information in the $n^{th}$ encapsulated MAC PDU. Specifically if BSR information of more than two LCGs is not included in a previous MAC PDU, then the user equipment 1 transmits in a long BSR the buffer information of the plurality of LCGs in the $n^{th}$ MAC PDU, and if BSR information of only one LCG is not included in a previous MAC PDU, then the user equipment 1 shall include a short BSR in the $n^{th}$ MAC PDU. Preferably when part of content of the BSR, for example, buffer size information of the LCG #0, buffer size information of the LCG #1 and buffer size information of the LCG #2, has been included in padding bits of at least one MAC PDU preceding the $n^{th}$ MAC PDU, then the user equipment 1 can simply include only in a short BSR or a truncated BSR, buffer size information of the LCG #3 in the $n^{th}$ MAC PDU, and service data can be transmitted in spared bits.

In summary, the foregoing solution A and solution B encapsulate MAC PDUs from perspectives of reliability and efficiency respectively. The solution A transmits a BSR repeatedly in a plurality of MAC PDUs, and it can improve the reliability of transmission due to the plurality of transmissions. The solution can improve the efficiency of transmission in that it makes full use of padding bits and more data can be transmitted in spared bits.

(2) All of MAC PDUs are Encapsulated in Parallel in One TTI.

In this situation, all the MAC PDUs are encapsulated in parallel, and the user equipment 1 encapsulating one MAC PDU does not know whether there are padding bits in the other MAC PDUs, so only the solution A introduced for serial encapsulation of MAC PDUs can be applied to padding bits, that is, a copy of a whole periodic/regular BSR or a part thereof can be transmitted in a padding BSR to thereby improve the reliability of transmission.

(3) BSR Mapping Table

Furthermore padding bits can further provide increment information for a BSR mapping table with a coarse granularity to thereby improve the precision of the BSR mapping table.

A buffer size table, i.e., Table 1, defines the largest buffer size level determined by an uplink peak rate multiplied by a desired response time. However the buffer table may fail to support an accurate buffer status information report due to an increase in peak rate resulting from the introduction of carrier aggregation and uplink MIMO. In order ensure an unchanged 6-bit buffer status, one solution is to increase this maximum value with a coarse granularity, that is, there is an increased difference between adjacently indexed buffer sizes to accommodate a total buffer size increasing with an increasing peak rate. For the solution with a coarse-granularity table, the invention proposes the following enhanced solution: both a padding BSR and a regular/periodic BSR are used together to thereby provide more accurate BSR information. Beside this, an R (reserved) bit in an MAC sub-header can be used to distinguish between the original BSR information and the increment information.

For example, two MAC PDUs are transmitted in one TTI. A regular/periodic BSR is triggered and it will be transmitted in one MAC PDU, and a padding BSR is supported in the other remaining MAC PDU. In an embodiment, there is only one LCG, and the actual buffer amount is 111148 bytes, so a report index of periodic/regular BSR shall be 61 (109439<Buffer Status 111148<=128125) according to Table 1. Furthermore the padding BSR reports the index of 1709 (1709=111148-109439) as 34 (1552<Buffer Status 1709<=1817), and an R bit in an MAC sub-header where the padding BSR is located is set, for example, to 1 indicating that 1709 is an increment. Thus more accurate uplink buffer size information can be provided when the increment information is reported in the padding BSR.

In another embodiment, more accurate information can be provided in a multi-level increment manner. A description will be given taking as an example such a situation that three MAC PDUs are transmitted in one TTI, a periodic/regular BSR is triggered and it will be transmitted in one MAC PDU, and there is only one LCG and the actual buffer amount is 111148 bytes, and a padding BSR is supported in both of the other two MAC PDUs. Those skilled in the art can appreciate that 4 fields, i.e., R/R/E/LCID respectively, are included in a sub-header of an MAC PDU, and for example, the first R bit can be set as an identifier of a first level of increment, and the second R bit can be set as an identifier of a second level of increment. Then a padding BSR of the first MAC PDU is indexed 61, a padding BSR of the second MAC PDU is indexed 34 (1709=111148-109439), and a padding BSR of the third MAC PDU is indexed 157 (157=1709-1552) is indexed 19.

The foregoing respective steps have been described from the perspective of a transmitter, i.e., the user equipment 1. A brief description will be given below from the perspective of the base station 2, i.e., a receiver, and the base station 2 receives an MAC PDU from the user equipment 1, and then the base station 2 extracts an BSR message from the MAC PDU, in which an BSR is encapsulated, according to how the MAC PDU is encapsulated, to thereby allocate and schedule an uplink resource for the user equipment 1.

Figure 6:
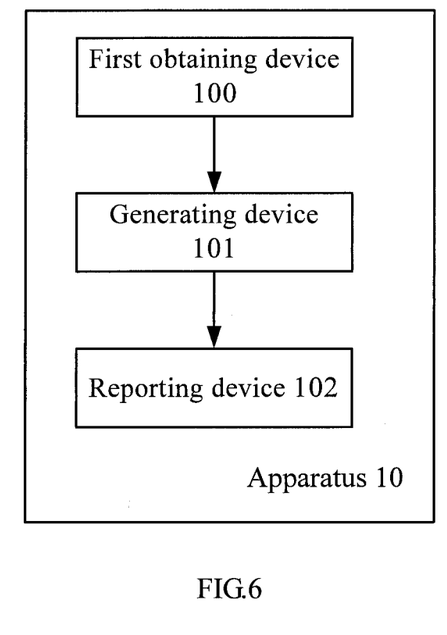
FIG. 6 illustrates a block diagram of an apparatus according to an embodiment of the invention.

FIG. 6 illustrates a block diagram of an apparatus according to an embodiment of the invention, where the apparatus 10 is located in the user equipment illustrated in FIG. 1. The apparatus 10 includes a first obtaining device 100, a generating device 101 and a reporting device 102. In an embodiment, the user equipment is configured with a plurality of component carriers Firstly the first obtaining device 100 is configured to obtain an amount of data to be transmitted after respective media access layer protocol data units corresponding to the respective component carriers are generated;

Then the generating device 101 is configured to generate the uplink buffer status report message according to the amount of data to be transmitted; and Then the reporting device 102 is configured to report the uplink buffer status report message to the base station 2.

In an embodiment, the reporting device 102 is further configured to transmit the uplink buffer status report message to the base station serving the user equipment over one of the at least one component carriers.

In an embodiment, the respective media access layer protocol data units correspond to logical channels with different priorities, and the generating device 101 is further configured to encapsulate the uplink buffer status report message and data corresponding to the logical channel with the highest priority in a media access layer protocol data unit; and the reporting device 102 is further configured to transmit the media access layer protocol data unit, in which the uplink buffer status report message is encapsulated, to the base station 2 serving the user equipment 1.

TABLE 1

Buffer Size Levels of BSR

| Index | Buffer size (BS) in byte |
| --- | --- |
| 0 | BS = 0 |
| 1 | 0 < BS <= 10 |
| 2 | 0 < BS <= 12 |
| 3 | 12 < BS <= 14 |
| 4 | 14 < BS <= 17 |
| 5 | 17 < BS <= 19 |
| 6 | 19 < BS <= 22 |
| 7 | 22 < BS <= 26 |
| 8 | 26 < BS <= 31 |
| 9 | 31 < BS <= 36 |
| 10 | 36 < BS <= 42 |
| 11 | 42 < BS <= 49 |
| 12 | 49 < BS <= 57 |
| 13 | 57 < BS <= 67 |
| 14 | 67 < BS <= 78 |
| 15 | 78 < BS <= 91 |
| 16 | 91 < BS <= 107 |
| 17 | 107 < BS <= 125 |
| 18 | 125 < BS <= 146 |
| 19 | 146 < BS <= 171 |
| 20 | 171 < BS <= 200 |
| 21 | 200 < BS <= 234 |
| 22 | 234 < BS <= 274 |
| 23 | 274 < BS <= 321 |
| 24 | 321 < BS <= 376 |
| 25 | 376 < BS <= 440 |
| 26 | 440 < BS <= 515 |
| 27 | 515 < BS <= 603 |
| 28 | 603 < BS <= 706 |
| 29 | 706 < BS <= 826 |
| 30 | 826 < BS <= 967 |
| 31 | 967 < BS <= 1132 |
| 32 | 1132 < BS <= 1326 |
| 33 | 1326 < BS <= 1552 |
| 34 | 1552 < BS <= 1817 |
| 35 | 1817 < BS <= 2127 |
| 36 | 2127 < BS <= 2490 |
| 37 | 2490 < BS <= 2915 |
| 38 | 2915 < BS <= 3413 |
| 39 | 3413 < BS <= 3995 |
| 40 | 3995 < BS <= 4677 |
| 41 | 4677 < BS <= 5476 |
| 42 | 5476 < BS <= 6411 |
| 43 | 6411 < BS <= 7505 |
| 44 | 7505 < BS <= 8787 |
| 45 | 8787 < BS <= 10287 |
| 46 | 10287 < BS <= 12043 |
| 47 | 12043 < BS <= 14099 |
| 48 | 14099 < BS <= 16507 |
| 49 | 16507 < BS <= 19325 |
| 50 | 19325 < BS <= 22624 |
| 51 | 22624 < BS <= 26487 |
| 52 | 26487 < BS <= 31009 |
| 53 | 31009 < BS <= 36304 |
| 54 | 36304 < BS <= 42502 |
| 55 | 42502 < BS <= 49759 |
| 56 | 49759 < BS <= 58255 |
| 57 | 58255 < BS <= 68201 |
| 58 | 68201 < BS <= 79846 |
| 59 | 79846 < BS <= 93479 |
| 60 | 93479 < BS <= 109439 |
| 61 | 109439 < BS <= 128125 |
| 62 | 128125 < BS <= 150000 |
| 63 | BS > 150000 |

In an embodiment, the generating unit 101 is further configured to generate the uplink buffer status report message in a first media access layer protocol data unit and to fill repeatedly at least part of content of the uplink buffer status report message in padding bits of at least one other media access layer protocol data unit with the padding bits;

Then the transmitting device 102 is further configured to report the uplink buffer status report message to the base station 2 over the first component carrier and to report the at least part of the content of the uplink buffer status report message to the base station 2 over the at least one other component carrier in the mean time.

For example, the generating device 101 further includes:

A second obtaining device configured to obtain a size of the padding bits; and

The generating device 101 is further configured to fill repeatedly all the content of the uplink buffer status report message in the padding bits of the at least one other media access layer protocol data unit with the padding bits when the padding bits are sufficient to include all the content of the uplink buffer status report message;

Otherwise, the generating device 101 is further configured to fill repeatedly a part of the content of the uplink buffer status report message in the padding bits of the at least one other media access layer protocol data unit with the padding bits.

In another embodiment, when the media access layer protocol data units over the respective component carriers are generated serially and the uplink buffer status report message was originally scheduled to be transmitted over a first media access layer protocol data unit over a component carrier, the generating device 101 is further configured to include at least a part of the uplink buffer status report message in padding bits of at least one preceding media access layer protocol data unit, which is encapsulated prior to the first media access layer protocol data unit; and thus the apparatus 10 further includes: a determining device (not illustrated) configured to determine whether the whole uplink buffer status report message or a part of the uplink buffer status report message is included in the padding bits of the at least one preceding media access layer protocol data unit; and the generating device 101 is further configured:

To encapsulate data contents in a part of the first media access layer protocol data unit, which was originally scheduled to transmit the uplink buffer status report message when the whole uplink buffer status report message is included in the padding bits of the at least one first media access layer protocol data unit; or To encapsulate the remaining uplink buffer status report message in the first media access layer protocol data unit and encapsulate data content in a spared part when the part of the uplink buffer status report message is included in the padding bits of the at least one first media access layer protocol data unit.

Furthermore in another embodiment, the generating device 101 is further configured:

To generate a regular or periodic uplink buffer status report message and a padding uplink buffer status report message respectively according to the amount of data to be transmitted, wherein the regular or periodic uplink buffer status report message is used to represent a first value range in which the amount of data to be transmitted is located, and the padding uplink buffer status report message is used to represent a second value range in which a difference between the amount of data to be transmitted and a lower limit of the first value range is located.

It shall be noted that the foregoing embodiments are illustrative of but not limiting the invention. Any technical solutions without departing from the spirit of the invention shall fall into the scope of the invention, and these encompass the use of different technical features appearing in different embodiments as well as possible combination of scheduling methods to attain an advantageous effect. Furthermore, any reference numerals in the claims shall not be construed as limiting the scope of the claims in question; the term "comprising" will not preclude an device(s) or step(s) which is(not) listed in another claim(s) or the description; "a/an" preceding a device will not preclude the presence of a plurality of such devices; one or more functions of a plurality of devices included in an apparatus can be performed by the same module in hardware or software; and the terms "first", "second", etc., are intended to merely designate a name but not to represent any specific order.

The invention claimed is:

1. A method of reporting an uplink buffer status report message in a user equipment configured with a plurality of component carriers, the method comprising:
   obtaining an amount of data to be transmitted after respective media access layer protocol data units corresponding to the respective component carriers are generated;
   generating the uplink buffer status report message according to the amount of data to be transmitted; and
   reporting, by encapsulating only one regular or periodic buffer status report message in one transport time interval, the uplink buffer status report message to a base station serving the user equipment;
   wherein the generating further comprises:
   generating a regular or periodic uplink buffer status report message and a padding uplink buffer status report message respectively according to the amount of data to be transmitted, wherein the regular or periodic uplink buffer status report message is used to represent a first value range in which the amount of data to be transmitted is located, and the padding uplink buffer status report message is used to represent a second value range in which a difference between the amount of data to be transmitted and a lower limit of the first value range is located.

2. The method according to claim 1, wherein the reporting further comprises: transmitting the uplink buffer status report message to the base station serving the user equipment over one of the plurality of component carriers.

3. The method according to claim 2, wherein the respective media access layer protocol data units correspond to logical channels with different priorities, and the generating further comprises:
   encapsulating the uplink buffer status report message and data corresponding to the logical channel with the highest priority in a media access layer protocol data unit; and
   the reporting further comprises:
   transmitting the media access layer protocol data unit, in which the uplink buffer status report message is encapsulated, to the base station serving the user equipment.

4. The method according to claim 1, wherein the generating further comprises: placing the uplink buffer status report message in a first media access layer protocol data unit; and placing repeatedly at least part of content of the uplink buffer status report message in padding bits of at least one other media access layer protocol data unit with the padding bits; and
   the reporting further comprises: reporting the uplink buffer status report message to the base station over a first component carrier corresponding to the first media access layer protocol data unit; and reporting the at least part of the content of the uplink buffer status report message to the base station over at least one other component carrier corresponding to the at least one other media access layer protocol data unit in the mean time.

5. The method according to claim 4, wherein the placing repeatedly further comprises:
   obtaining a size of the padding bits; and
   placing repeatedly all the content of the uplink buffer status report message in the padding bits of the at least one other media access layer protocol data unit with the padding bits when the padding bits are sufficient to include all the content of the uplink buffer status report message;
   otherwise, placing repeatedly a part of the content of the uplink buffer status report message in the padding bits of the at least one other media access layer protocol data unit with the padding bits.

6. The method according to claim 5, wherein the uplink buffer status report message includes respective uplink buffer status information of logical channel groups with different priorities, and the otherwise, placing repeatedly further comprises:
   filling the corresponding uplink buffer status information according to the priorities of the logical channel groups when the uplink buffer status report message is placed repeatedly in the padding bits of the at least one other media access layer protocol data unit with the padding bits.

7. The method according to claim 1, wherein the only one regular or periodic buffer status report message is a regular buffer status report message.

8. The method according to claim 1, wherein the only one regular or periodic buffer status report message is a periodic buffer status report message.

9. A method of reporting an uplink buffer status report message in a user equipment configured with a plurality of component carriers, the method comprising:
   obtaining an amount of data to be transmitted after respective media access layer protocol data units corresponding to the respective component carriers are generated;
   generating the uplink buffer status report message according to the amount of data to be transmitted; and
   reporting, by encapsulating only one regular or periodic buffer status report message in one transport time interval, the uplink buffer status report message to a base station serving the user equipment;
   wherein when the media access layer protocol data units over the respective component carriers are generated serially and the uplink buffer status report message was originally scheduled to be transmitted over a second media access layer protocol data unit over a component carrier, the generating further comprises:
   including at least part of the uplink buffer status report message in padding bits of at least one preceding media access layer protocol data unit, which is encapsulated prior to the second media access layer protocol data unit; and
   after the generating, the method further comprises:
   determining whether the whole uplink buffer status report message or a part of the uplink buffer status report message is included in the padding bits of the at least one preceding media access layer protocol data unit; and
   encapsulating data content in a part of the second media access layer protocol data unit, which was originally scheduled to transmit the uplink buffer status report message when the whole uplink buffer status report message is included in the padding bits of the at least one preceding media access layer protocol data unit; or
   encapsulating the remaining uplink buffer status report message in the second media access layer protocol data unit and encapsulating data content in a spared part when the part of the uplink buffer status report message is included in the padding bits of the at least one preceding media access layer protocol data unit.

10. An apparatus for reporting an uplink buffer status report message in a user equipment configured with a plurality of component carriers, the apparatus comprising:
a first obtaining device configured to obtain an amount of data to be transmitted after respective media access layer protocol data units corresponding to the respective component carriers are generated;
a generating device configured to generate the uplink buffer status report message according to the amount of data to be transmitted; and
a reporting device configured to report, by encapsulating only one regular or periodic buffer status report message in one transport time interval, the uplink buffer status report message to a base station serving the user equipment;
wherein the generating device is further configured:
to generate a regular or periodic uplink buffer status report message and a padding uplink buffer status report message respectively according to the amount of data to be transmitted, wherein the regular or periodic uplink buffer status report message is used to represent a first value range in which the amount of data to be transmitted is located, and the padding uplink buffer status report message is used to represent a second value range in which a difference between the amount of data to be transmitted and a lower limit of the first value range is located.

11. The apparatus according to claim 10, wherein the reporting device is further configured: to transmit the uplink buffer status report message to the base station serving the user equipment over one of the plurality of component carriers.

12. The apparatus according to claim 11, wherein the respective media access layer protocol data units correspond to logical channels with different priorities, and the generating device is further configured:
to encapsulate the uplink buffer status report message and data corresponding to the logical channel with the highest priority in a media access layer protocol data unit; and
the reporting device is further configured:
to transmit the media access layer protocol data unit, in which the uplink buffer status report message is encapsulated, to the base station serving the user equipment.

13. The apparatus according to claim 10, wherein the generating unit is further configured: to generate the uplink buffer status report message in a first media access layer protocol data unit; and to fill repeatedly at least part of content of the uplink buffer status report message in padding bits of at least one other media access layer protocol data unit with the padding bits; and
the reporting device is further configured: to report the uplink buffer status report message to the base station over a first component carrier corresponding to the first media access layer protocol data unit; and to report the at least part of the content of the uplink buffer status report message to the base station over at least one other component carrier corresponding to the at least one other media access layer protocol data unit in the mean time.

14. The apparatus according to claim 13, wherein the generating device further comprises:
a second obtaining device configured to obtain a size of the padding bits; and
the generating device is further configured to fill repeatedly all the content of the uplink buffer status report message in the padding bits of the at least one other media access layer protocol data unit with the padding bits when the padding bits are sufficient to include all the content of the uplink buffer status report message;
otherwise, the generating device is further configured to fill repeatedly a part of the content of the uplink buffer status report message in the padding bits of the at least one other media access layer protocol data unit with the padding bits.

15. An apparatus for reporting an uplink buffer status report message in a user equipment configured with a plurality of component carriers, the apparatus comprising:
a first obtaining device configured to obtain an amount of data to be transmitted after respective media access layer protocol data units corresponding to the respective component carriers are generated;
a generating device configured to generate the uplink buffer status report message according to the amount of data to be transmitted; and
a reporting device configured to report, by encapsulating only one regular or periodic buffer status report message in one transport time interval, the uplink buffer status report message to a base station serving the user equipment;
wherein when the media access layer protocol data units over the respective component carriers are generated serially and the uplink buffer status report message was originally scheduled to be transmitted over a first media access layer protocol data unit over a component carrier, the generating device is further configured:
to include at least part of the uplink buffer status report message in padding bits of at least one preceding media access layer protocol data unit, which is encapsulated prior to the second media access layer protocol data unit; and
the apparatus further comprises:
a determining device configured to determine whether the whole uplink buffer status report message or a part of the uplink buffer status report message is included in the padding bits of the at least one preceding media access layer protocol data unit; and
the generating device is further configured:
to encapsulate data contents in a part of the second media access layer protocol data unit, which was originally scheduled to transmit the uplink buffer status report message when the whole uplink buffer status report message is included in the padding bits of the at least one preceding media access layer protocol data unit; or
to encapsulate the remaining uplink buffer status report message in the second media access layer protocol data unit and encapsulate data content in a spared part when the part of the uplink buffer status report message is included in the padding bits of the at least one preceding media access layer protocol data unit.

* * * * *